R. L. MAPSON.
COMBINED SPARE TIRE SUPPORT AND RIM REMOVING APPARATUS.
APPLICATION FILED OCT. 1, 1919.

1,350,372. Patented Aug. 24, 1920.

INVENTOR.
ROBERT L. MAPSON
BY
ATTORNEY

UNITED STATES PATENT OFFICE.

ROBERT L. MAPSON, OF LOS ANGELES, CALIFORNIA, ASSIGNOR OF ONE-THIRD TO LORENZO SPERBECK AND ONE-THIRD TO E. I. WHEELER, BOTH OF LOS ANGELES, CALIFORNIA.

COMBINED SPARE-TIRE SUPPORT AND RIM-REMOVING APPARATUS.

1,350,372.  Specification of Letters Patent.  Patented Aug. 24, 1920.

Application filed October 1, 1919. Serial No. 327,755.

*To all whom it may concern:*

Be it known that I, ROBERT L. MAPSON, a citizen of the United States, residing at Los Angeles, in the county of Los Angeles and State of California, have invented certain new and useful Improvements in Combined Spare-Tire Supports and Rim-Removing Apparatus, of which the following is a specification.

My invention relates to a combined means for supporting a spare tire and for facilitating the removing of the tire from the rim and the objects of my invention are: first, to provide a means for supporting a spare tire which also serves as a device for facilitating the removing of the tire from the rim; second, to provide a device of this class wherein the engaging ends of the rim are moved so that one end overlaps the other and contracting to such a position so that the tire may be readily removed therefrom; third, to provide a device of this class which is positioned on the conventional brackets on the back or side of an automobile and is used for removing the tire so that dirt, grass, stones and other debris is not taken up in the tire and causing early deterioration of the inner tube or casing; fourth, to provide a device of this class with means in connection therewith for locking the spare tire in position; fifth, to provide a device of this class which is applicable to the different makes of collapsible rims now in use and sixth, to provide a device of this class which is very simple and economical of construction, durable, efficient in its action and which will not readily deteriorate or get out of order.

Figure 1:
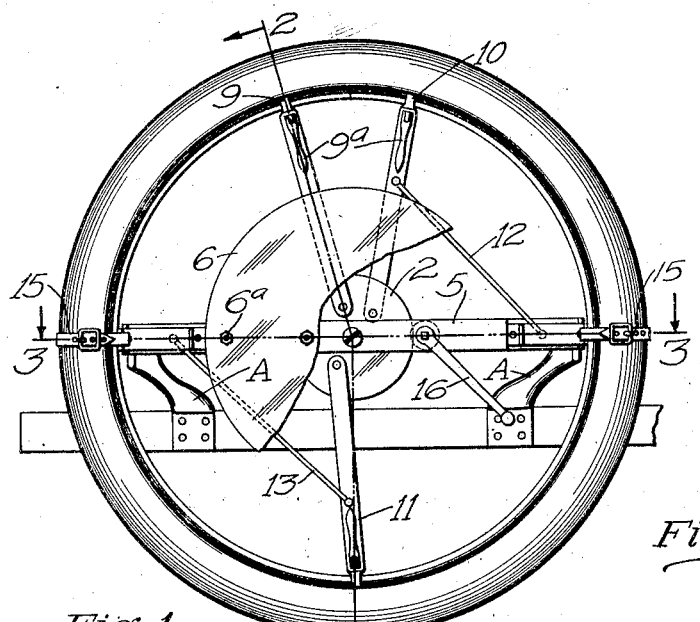
Figure 2:
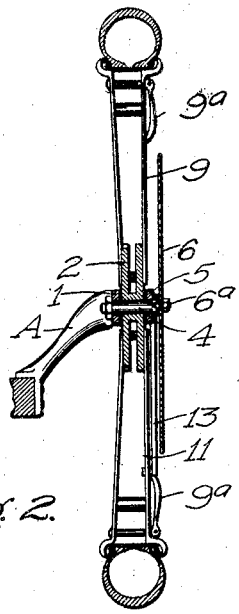
Figure 3:
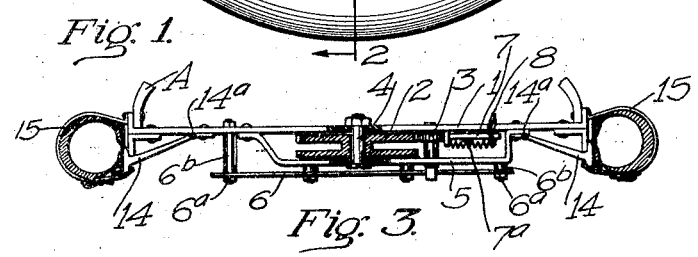
Figure 4:
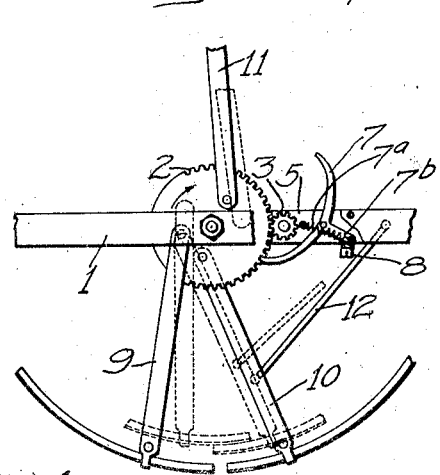
Figure 5:
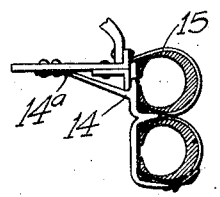

With these and other objects in view as will appear hereinafter my invention consists of certain novel features of construction, combination and arrangement of parts and portions as will be hereinafter described in detail and particularly set forth in the appended claims reference being had to the accompanying drawings and to the characters of reference thereon which form a part of this application, in which:

Figure 1 is a rear view of my device shown in position on the conventional spare tire supporting brackets of the vehicle and showing the tire and rim in position thereon showing portions broken away to facilitate the illustration; Fig. 2 is a sectional view through 2—2 of Fig. 1; Fig. 3 is a sectional view through 3—3 of Fig. 1; Fig. 4 is a view upside down to that of Fig. 1 and showing a fragmentary portion only thereof and showing by dotted lines a varying position of the rim when contracting the same for removal and Fig. 5 is a detailed sectional view showing the device in a slightly modified form as applied when two spare tires are carried.

Similar characters of reference refer to similar parts and portions throughout the several views of the drawings.

The supporting bar 1, gear member 2, pinion member 3, shaft 4, supporting bar 5, cover plate 6, ratchet pawl 7, ratchet pawl lock 8, arms 9, 10 and 11, braces 12 and 13, wedge members 14, straps 15 and crank 16 constitute the principal parts and portions of my combined spare tire support and rim removing apparatus.

The supporting bar 1 is secured to the brackets A which are the conventional brackets used for the tire support. To this supporting bar 1 is secured another supporting bar 5, the main portion of which is spaced apart some distance and parallel with the supporting bar 1. Revolubly mounted between these bars 1 and 5 centrally relative to said support 1 is a gear segment member 2 which is a bifurcated plate member the one portion provided with teeth in a portion of its perimeter while the other is a plain plate. This member 2 is revolubly mounted on a bolt 4 forming a shaft. Mounted between said members 1 and 5 is also a pinion member 3 which meshes with the teeth in the gear member 2 and its one end extends through the support 5 and is provided with a square end adapted for the crank 16. Pivotally mounted on the member 2 is a double arm member 9 which is provided with an eccentric clamp lever 9ª. Its outer end is so shaped as to extend over and clamp the outer edges of the rim as shown best in Fig. 2 of the drawings. Spaced some distance therefrom is another similar arm member 10 except that it is a single member and it is mounted between the two bifurcated portions of the member 2. This arm member 10, however, is supported relatively to the support 1 by means of a brace member 12 which extends from near one end of the support 1 toward the outer end of the arm 10 and is for the purpose of controlling and regulating the movement of the arm 10 when the gear member 2 is revolved. Oppositely disposed to the arm members 9 and 10 and pivotally mounted on the member 2 is another arm member 11 similar to the member 9 and supported so that its outer end engages the rim intermediate its ends. It is supported similarly for regulation and control to the member 10 by means of a brace member 13 pivotally secured to the member 11 near its outer end and to the member 1 in the opposite end from the support of the brace 12. A slight space is left between the support 1 and the rim which is adapted for the insertion of the wedge member 14 which secures the rim relatively to the support 1 at its opposite ends. This member 14 is pivoted at 14$^a$ to provide for its movement. Secured over the center is a plate 6 which serves as a cover plate for the central operating portions and is supported by means of bolts 6$^a$ and dividers 6$^b$. Pivotally mounted on the support 1 is a double ratchet pawl 7 which is adapted to engage the teeth of the gear member 2 and hold the gear member 2 is certain position and prevent its turning. It is provided with an overcenter spring 7$^a$ tending to hold it in engagement with the teeth when the handle portion 7$^b$ is turned to a certain position so that it engages the gear teeth of the member 2 when moved in either direction. This handle member 7$^b$ may be locked to the member 1 by means of a padlock 8 as shown best in Fig. 4 of the drawings so that the rim cannot be expanded or contracted for removal from the support while the device is so locked. The crank 16 is preferably carried in a tool box but may be secured in position if desired. In the modified form of construction shown in Fig. 5 the member 14 is extended, forming a bracket for another spare rim.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

It is obvious that with this construction there is provided a device for supporting spare tires mounted on the rim which performs another function of facilitating the removal of the tire from the rim in the same position it occupies in supporting the spare tire; that by turning the crank 16 the gear member 2 is revolved moving the inner end of the member 10 in one direction and its outer end in the opposite direction by reason of the fulcrum brace 12; that the member 9 is carried in one direction carrying with it the rim and that the inner end of the member 11 is moved in one direction and its outer end in the opposite direction by means of its fulcrum brace 13 thus providing a device wherein the one end of the rim is made to separate slightly then the other end moved inwardly slightly so that the ends will pass each other all as shown by solid and dotted lines in Fig. 4 of the drawings.

Having thus described my invention what I claim as new and desire to secure by Letters Patent, is:

1. In an apparatus of the class described, a supporting member, a member revolubly mounted centrally thereon, a pair of spaced clamp members pivoted to said revolubly mounted member and their outer ends provided with clamps adapted to clamp the free ends of a vehicle rim, means for supporting one of said clamp members intermediate its ends, another clamp member pivoted to said revoluble member opposite to the pivotal mounting of the other clamp member and its free ends adapted to engage the rim intermediate its ends for supporting the same.

2. In an apparatus of the class described, a supporting member, a member revolubly mounted centrally thereon, a pair of spaced clamp members pivoted to said revolubly mounted member and their outer ends provided with clamps adapted to clamp the free ends of a vehicle rim, means for supporting one of said clamp members intermediate its ends, another clamp member pivoted to said revoluble member opposite to the pivotal mounting of the other clamp member and its free ends adapted to engage the rim intermediate its ends, means engaging said supporting member intermediate its ends for supporting the same, means for revolving said revoluble member comprising a pinion adapted to engage the teeth on said revoluble member and a crank fitting the shank of the pinion axle.

3. In an apparatus of the class described, a supporting member, a member revolubly mounted centrally thereon, a pair of spaced clamp members pivoted to said revolubly mounted member and their outer ends provided with clamps adapted to clamp the free ends of a vehicle rim, means for supporting one, of said clamp members intermediate its ends, another clamp member pivoted to said revoluble member opposite to the pivotal mounting of the other clamp member and its free ends adapted to engage the rim intermediate its ends, means engaging said supporting member intermediate its ends for supporting the same, means for revolving said revoluble member comprising a pinion adapted to engage the teeth on said revoluble member, a crank fitting the shank of the pinion axle and ratchet pawl means for preventing the return movement of said revoluble member.

4. In an apparatus of the class described, a supporting member, a member revolubly mounted centrally thereon, a pair of spaced clamp members pivoted to said revolubly mounted member and their outer ends provided with clamps adapted to clamp the free ends of a vehicle rim, means for supporting one of said clamp members intermediate its ends, another clamp member pivoted to said revoluble member opposite to the pivotal mounting of the other clamp member and its free ends adapted to engage the rim intermediate its ends, means engaging said supporting member intermediate its ends for supporting the same, means for revolving said revoluble member comprising a pinion adapted to engage the teeth on said revoluble member, a crank fitting the shank of the pinion axle, ratchet pawl means for preventing the return movement of said revoluble member and means for locking said ratchet pawl whereby the spare rim is secured to said apparatus.

5. In an apparatus of the class described, a supporting member, a gear revolubly mounted centrally on said supporting member, a pinion meshing with said gear, a plurality of arms pivoted on said gear, clamp means for securing the free ends of said clamp members to the rim and means for supporting a portion of said arms intermediate their ends.

6. In an apparatus of the class described, a pair of spaced apart supporting members, a gear revolubly mounted centrally between said supporting members, a pinion meshing with said gear, a plurality of arms pivoted on said gear, clamp means for securing the free ends of said clamp members to the rim, means for supporting a portion of said arms intermediate their ends and means for locking said revoluble member from turning in either direction.

7. In an apparatus of the class described, a pair of spaced apart supporting members, a gear revolubly mounted centrally between said supporting members, a pinion meshing with said gear, a plurality of arms pivoted on said gear, clamp means for securing the free ends of said clamp members to the rim, means for supporting a portion of said arms intermediate their ends, means for locking said revoluble member from turning in either direction and wedge means pivotally mounted on one of said supports adapted to be inserted between the ends of said support and the rim whereby a tight joint is formed between the ends of said support and the rim.

In testimony whereof, I have hereunto set my hand at San Diego California this 22d day of September 1919.

ROBERT L. MAPSON.